Sept. 13, 1960 P. H. PELLEY 2,952,100
APPARATUS FOR ABRASIVELY SURFACING PLASTIC SHEETS
Filed Dec. 8, 1955
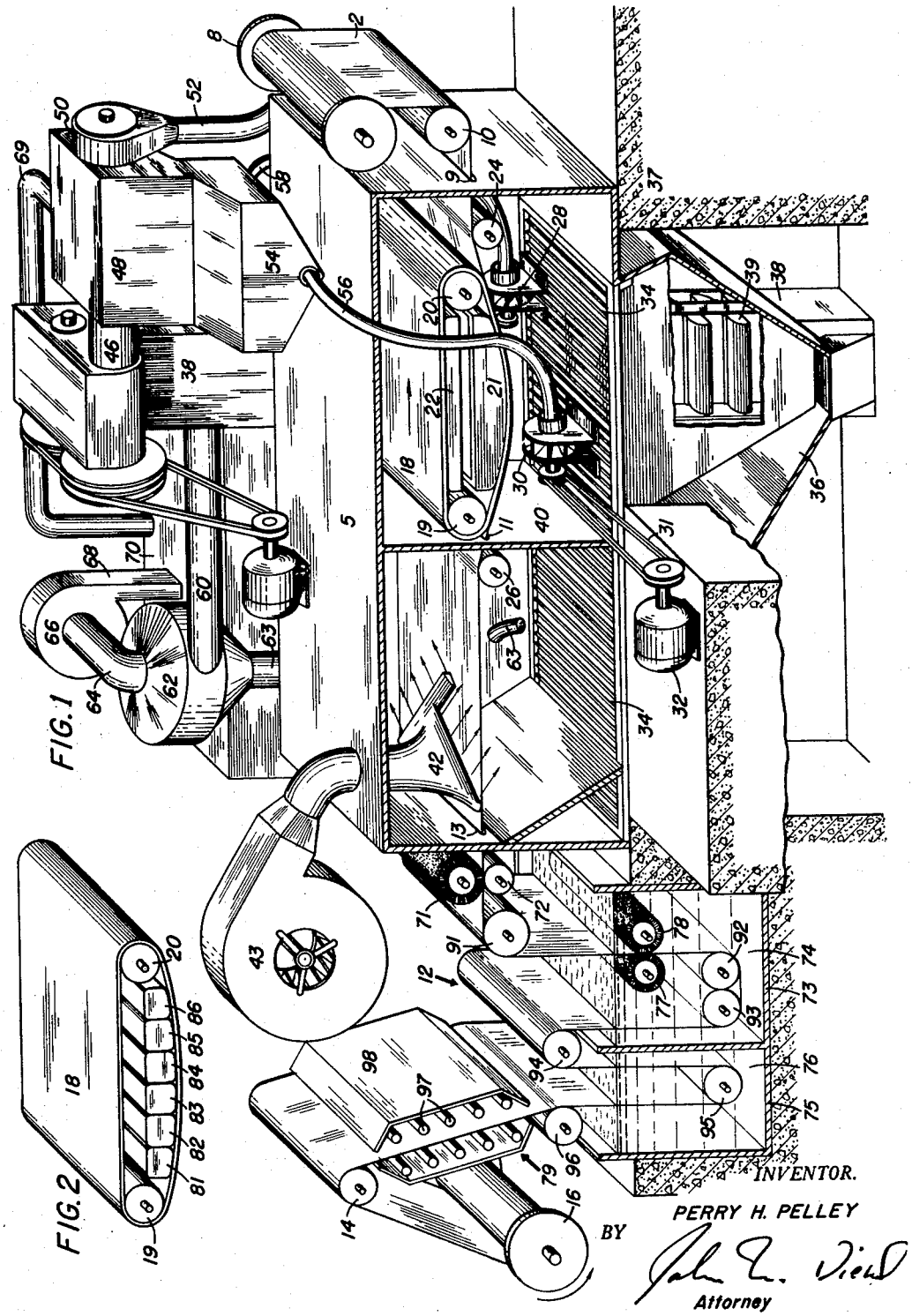
INVENTOR.
PERRY H. PELLEY
BY
Attorney

United States Patent Office 2,952,100
Patented Sept. 13, 1960

2,952,100

APPARATUS FOR ABRASIVELY SURFACING PLASTIC SHEETS

Perry H. Pelley, Wichita, Kans., assignor, by mesne assignments, to Wheelabrator Corporation, Mishawaka, Ind.

Filed Dec. 8, 1955, Ser. No. 551,885

7 Claims. (Cl. 51—14)

This invention relates to apparatus for providing abraded surfaces on plastic sheets and more particularly to apparatus for abrasively producing matte surfaces on extremely thin continuous webs of synthetic resinous materials.

Apparatus for abrasively treating the surfaces of metal articles by the centrifugal hurling of abrasive particles, steel shot and the like thereagainst are well known and apparatus for abrasively treating the surfaces of continuous webs of metal sheet have been described in U.S. Patents 2,173,364 and 2,204,588. U.S. Patent 2,448,316 describes an apparatus of a different type for treating relatively thick plastic sheets; and U.S. Patent 2,131,776 describes an apparatus for centrifugally abrading the surfaces of relatively thick continuous webs of metal sheets. The present invention represents an improvement over these several devices for the reason that extremely thin plastic films, having a thickness for example of .00025 inch, that is ¼ of ¹⁄₁₀₀₀ of an inch, can successfully be given a matte surface or "frosted" surface having almost any desired degree of haziness or light-scattering effect.

The provision of a matte surface on a continuous web of synthetic resinous material may have any one of several objects. Such a surface is often desirable for improving the adhesion of conventional synthetic resinous adhesives thereto in order to improve the resistance to delamination of laminates made with other webs of the same or similar material or made with other webs of such materials as metal, plastic, cellulose fiber board, paper, and the like. Another object may be to provide a surface having improved adhesion for photo-sensitive coatings as described in co-pending application Serial No. 551,886 filed December 8, 1955. Another object may be to provide a surface directly receptive to pen and pencil lines. Another object of treating such webs is to reduce the light reflectivity of the surface, that is to reduce the sheen or shininess and thereby provide a surface having a patina which has been found greatly preferable in aesthetic quality to the naturally extremely smooth and glossy surfaces which characterize almost all continuous webs of synthetic resinous material in the forms in which they can be economically commercially produced.

For several reasons the apparatus mentioned above cannot successfully be used to achieve these objectives on thin continuous webs of synthetic resinous material even though the web may consist of any one of many types of conventional laminates comprising reinforcing layers of paper, glass, cloth, woven glass cloth, woven cotton cloth, unwoven glass or cellulosic reinforcing webs with any one of several orientations of the fibers therein. For example the device described in Patent 2,448,316 relates only to the abrading of thermoplastic materials whereas many such laminates are not thermoplastic, and is further disadvantageous in that methods of accomplishing the abrading by means other than the use of abrasive throwing steel have been found inadequate and unsatisfactory. The device of U.S. Patent 2,173,364 requires that the sheet be of sufficient strength to support itself through at least a small portion of an arcuate path or that it travel against a stationary shoe, whereas the device of U.S. Patent 2,131,776 provides that the web support itself between rollers, whereas many resinous webs and also metal webs which it is desired to treat have insufficient strength to support themselves in this manner. This and other disclosures call for the web to be supported on the top of a horizontally disposed conveyor belt and U.S. Patent 2,204,588 and other patents disclose centrifugally throwing abrasive grit, steel shot or the like upward against a continuously moving web "backed-up" by a horizontal run of a conveyor belt disposed thereabove.

In the instant invention an extremely thin continuous plastic web is abrasively treated by centrifugally throwing a suitable grit or abrasive material upward against the undersurface thereof at a point where the web is backed up by a downwardly convex arcuate lower run of a conveyor belt having a rubber or other elastomeric surface. It is thus possible to provide the above described highly desirable matte finish on the surface of a plastic web and this cannot be accomplished with the previously described devices of the types mentioned. Upward blasting against the surface of a plastic web is necessary because it was surprisingly discovered that downward blasting results in leaving residual particles on the upper surfaces of the web which not only provides a deleterious surface resulting from the removal mechanisms applied to dislocate such residual particles from the upper surface but which also provides a cushioning effect which cannot be overcome by any expedient and which results in making impossible the accomplishment of the desired surface. The same was found true of sidewise blasting against vertical surfaces. For some reason, probably the electrostatic attraction of most plastics which have been subjected to mechanical treatment, residual particles adhere to the surface of the web with great force and although this is objectionable in the case of upward blasting, it is productive of such poor results in the case of downward blasting that downward blasting is infeasible. The use of a back-up belt above the web when blasting upward is necessary in order to prevent the force of the blast from upwardly distorting the web. It has been found necessary that the web being treated be held firmly against the back-up belt in order to prevent transient bending or flexing which results in non-uniform treatment of the surface due to uncontrolled change in the angle with which the granules, abrasive or shot strike the surface of the web. It is also necessary to prevent permanent local deformations of the web which may result when such nonuniformity in treatment exists.

Although not described in the above-mentioned patents, it has been conventional to pass a long horizontal run of a continuous metal web over a plurality of abrasive throwing wheels with the upper surface of the web being disposed in contact with the lower run of a horizontally traveling back-up belt. The web has been maintained in contact with the back-up belt by the upwardly directed force imposed on the lower surface thereof by the streams of granules thrown by the wheels.

The extremely thin plastic webs to which this invention relates are torn to shreds by comparable streams of abrasive materials and can only be abraded with streams of abrasive granules having sufficiently light weight and sufficiently low momentum to merely abrade the surface without destroying the sheet and such streams of abrasive are generally of insufficient force to maintain the web in contact with a back-up belt or back-up shoe. Furthermore in order to accomplish the production of a surface of the type desired without destroying the web it is necessary that the streams be directed at an acute angle with respect to the surface of the web and such streams tend far more to displace the web horizontally than to maintain it in contact with the back-up means. Stationary back-up means such as shoes cannot be used because residual abrasive collecting thereon adheres to the surface thereof and produces scratches in the surface of the web running thereagainst which are not only unsightly but are deleterious to the physical properties of the web, even though the surface of the belt be elastomeric.

By providing a back-up belt having a downwardly disposed arcuate lower run in conjunction with two idling rollers disposed at the ends of the back-up belt the tension which is necessarily present in the plastic web to pull it through the abrasive treating apparatus causes the web to be securely disposed against the lower surface of the back-up belt while it is abrasively treated in the manner hereinbefore described.

Thin metal webs may also be treated in the device and cannot be satisfactorily treated in previously described devices. Such metal webs are generally known as foil and may be described as webs having a thickness of .005 inch or less. Such webs of copper or aluminum are particularly suitable for treatment in the device. Such webs cannot be treated by apparatus previously described for the same reasons that thin plastic webs cannot be so treated. Apparatus of other types causes local permanent deformation to be produced or causes the web to be torn apart and destroyed. Also such webs are too thin and weak to be self-supporting just as are plastic webs of the type to which the invention applies.

It is therefore an object of this invention to provide an apparatus for suitably continuously abrasively treating a very thin continuous web comprising metal foil or organic synthetic resinous material which may contain a web of reinforcing material and which has an organic synthetic resinous surface.

Further objects will become apparent from the drawings and the following detailed description in which it is our intention to illustrate the applicability of the invention without thereby limiting its scope to less than that of all those equivalents which will be apparent to one skilled in the art.

In the drawings, like numerals refer to like parts and:

Figure 1 is a partially cutaway partially schematic perspective view of apparatus according to the invention;

Figure 2 is a perspective view of a modification of the back-up belt of Figure 1.

Referring now to Figure 1 there is shown a device for abrasively treating one surface of a plastic web comprising a housing 5. At one end of housing 5 there is provided storage or feed roll 8 for web 2 which may be as described elsewhere herein. Roll 8 is provided with drag or brake means adapted to resist unwinding of the web therefrom and thereby to provide tension in the web. Illustration of such means, which are well known in the art, has been omitted for the sake of simplicity. In one end of housing 5 there is provided slot 9 through which web 2 may enter the housing and adjacent slot 9 there is provided direction-changing roll 10 over which the web may pass. At the opposite end of housing 5 there is provided cleaning means indicated generally as 12 for removing residual abrasive granules from the web and drying means indicated generally as 79, and there is provided an idler roll 14 over which the web may pass and windup roll 16 which may be driven by any suitable means which for the sake of simplicity have not been illustrated. Driving means for roll 16 may suitably comprise an electric motor and a variable speed drive of any one of the types well known in the art. Within housing 5 there is provided back-up belt 18 which may travel continuously in the direction shown over rolls 19 and 20. The lower run is caused to travel in a downwardly arcuate path by shoe 21 disposed against the inner surface thereof and if desired the upper run of belt 18 may be supported by a shoe such as shoe 22. Adjacent the ends of belt 18 are idler rolls 24 and 26 over which web 2 may be caused to pass. These idler rolls are arranged to cause the web to be maintained tightly and closely against the lower run of belt 18 by reason of the tension produced in the web by the driving or pulling force of wind-up roll 16 acting against the resistance of feed roll 8. Within the cabinet and below belt 18 are located two throwing wheels 28 and 30. Wheel 30 may be driven by motor 32 through belt 31 or through any other suitable drive and wheel 28 may be driven similarly. The throwing wheels may be of conventional type described in the art, for example, as described in U.S. Patent 2,170,831. The wheels are arranged to cause abrasive granules to be centrifugally hurled at the lower or under surface of a portion of that part of the web which is supported by the lower run of belt 18 and preferably are arranged to cause the granules to be hurled at an acute angle, with respect to said lower surface.

In place of centrifugal throwing means comprising wheels 28 and 30 for projecting granules against the web in order to accomplish the abrasive treating of the surface thereof, there may be used any other suitable means for hurling abrasive granules at high velocity against the surface of a web (such as, for example, sand-blasting or vapor-blasting devices) wherein abrasive granules are conveyed from a storage reservoir, thence through a conveying tube and thence through a nozzle and against the surface of a web by means of a current of liquid media passing through the reservoir, the tube and the nozzle, with the granules. Such liquid media may be air or steam or may in some cases be a liquid such as water or a mixture of water and steam. However, for compelling economic and practical reasons centrifugal throwing wheels have been found preferable.

Housing 5 may be provided with a grating floor 34 and with a hoppered bottom 36, which may extend downwardly into a suitable pit provided in concrete base 37. Hoppered bottom 36 may open into the lower end of flight elevator 38 provided with flights 39.

Web 2 may travel from roll 8, over roll 10, through slot 9, over roll 24 under and against the lower surface of belt 18. It may then pass through a slot 11 in wall 40 which may be provided to minimize the distribution of random granules of abrasive within housing 5. It may then pass over idler roll 26 and below cleaning nozzle 42 which may blow air against its upper surface in the direction shown by the arrows to remove residual granules of abrasive therefrom. It may then pass through slot 13 in the wall of housing 5 and hence through cleaning apparatus 12 to windup roll 16. Abrasive granules thrown against the lower surface of web 2 by wheels 28 and 30 rebound therefrom and may then strike various portions of the interior of housing 5 and rebound several more times so that the interior portion of housing 5 tends to be filled with rebounding abrasive. Therefore a certain amount of abrasive collects on the upper surface of web 2 and this may be removed for the most part by air blown from nozzle 42. However, a certain amount of residual abrasive granules remains adherent to both surfaces of the web and must be removed by cleaning device 12. Abrasive thrown by wheels 28 and 30, after rebounding, falls by gravity to the bottom of hopper 36 and thence is carried upwardly by flights 39 of elevator 38. At the top of elevator 38 it is dumped into screw conveyor 46 which carries it to cleaning chamber 48. By conventional means, which have not been shown for the sake of simplicity, large particles, foreign matter, tramp iron and other impurities are removed by conventional screening devices and are carried into chamber 50 by the screw conveyor wherein they fall into a suitable receptacle through tube 52. Cleaned abrasive granules fall into hopper 54 and may thence pass downward through conventional well-known metering devices into tubes 56 and 58 which may feed the abrasive into the hubs of wheels 28 and 30.

The air which is introduced into housing 5 by nozzle 42 passes downward through grating floor 34 and upward through elevator 38 and thence outward through duct 60 into cyclone separator 62 and thence through tube 64 into blower 66. The draft within housing 5 and elevator 38 is provided by the combined actions of blower 43 introducing air at nozzle 42 and blower 66. From blower 66 air passes downward through duct 68 into device 70 which may remove residual light-weight dust from the air by causing it to pass through suitable fabric filter cloths. Heavier dust is removed in cyclone separator 62 and passes downward through tube 63 into housing 5 from whence it may be recycled. Within cleaning chamber 48 a current of air may be caused to pass through a cascade of abrasive falling therefrom into hopper 54 and relatively light-weight dust is thus removed from the abrasive granules and caused to be suspended in the air which may pass thence through duct 69 into device 70.

It may be mentioned that belt 18 may be made of cotton or rayon-reinforced rubber or other material suitable for conveyor belts preferably having a resilient or elastomeric surface.

Referring now to Figure 2 there is shown another means for providing an arcuate lower run in belt 18. In place of shoe 21 there are provided a plurality of shoes 81, 82, 83, 84, 85 and 86. Each of these shoes may be independently adjustable vertically upwards and downwards by any suitable means such as adjusting screws, illustration of precise means being omitted for the sake of simplicity since suitable constructions for adjusting screws and the like are well known. By means of a plurality of shoes such as shoes 81 to 86 the extent of downward projection of the lower run of the belt may suitably be varied to any extent desired. It has generally been found preferable to provide an arcuate run projecting downward at least about four inches and generally six inches for a belt having a distance of about 4 feet between the centers of rolls 19 and 20 and a width of about 4½ feet but the downward projection for a belt of this size may suitably be from about 3 inches to 12 inches and the projection for larger or smaller belts may be suitably varied in proportion thereto.

Cleaning and washing apparatus 12 may suitably include a rotating brush 71 which may operate against back-up roll 72, tank 73 containing detergent and washing solution 74, tank 75 containing clean rinsing water 76, rotating brushes 77 and 78 immersed in solution 74 and drier 79. The series of idling direction-changing rolls 91, 92, 93, 94, 95 and 96 may be provided to carry the web between brushes 77 and 78, through tanks 73 and 75, and through drier 79. Drier 79 may suitably consist of a plurality of radiant electric resistance elements 97 and reflectors 98 disposed to reflect radiation emitted therefrom against the web. In place of a drier of the type shown there may be provided an oven or tunnel provided with a flow of hot air therethrough, a gas-heated oven or any like means for drying moisture from a continuous web.

The mode of operation will be apparent from the previous description of the device. A continuous web is abrasively treated in the device by installing in suitable holding means a roll 8 of web material and then threading the web through the machine in the manner indicated. By then driving wind-up roll 16, by means not shown, to cause it to rotate in the direction indicated by the arrow, the web is pulled through the machine and maintained in close contact with the lower run of belt 18. As the centrifugal throwing wheels are rotated, abrasive enters the hubs of these wheels and is centrifugally thrown upward against the under-surface of the web by the vanes or blades in the wheels. Residual granules on the surface of the web are removed by cleaning device 12 and the web is dried by drier 79 and then wound on roll 16.

It is essential to the invention that the lower run of the back-up belt travel at the same speed as the web so that there is no relative longitudinal motion between the surface of the back-up belt and the surface of the web. In the event that the speed of the belt is improperly controlled so that differential movement takes place between the web and the arcuate lower run of the belt, the upper surface of the web is scratched by abrasive granules which find their way between the two surfaces.

It is a characteristic of all webs for which the apparatus is particularly suited that these webs are non-rigid and are generally extremely light in weight per unit area of web and therefore have so little strength that they cannot maintain themselves in place when subjected to a blast of abrasive granules nor can they be maintained against a horizontal back-up surface by a blast of abrasive granules of sufficiently low strength and directed at such an angle as to achieve a matte surface.

Materials which have been suitably provided with matte surfaces according to the invention have included polyethylene terephthalate webs (sold commercially as "Mylar" by duPont de Nemours) having thicknesses respectively of .005, .001, .0075 inch, a glass polyester laminate comprising a single ply of 116 glass fabric impregnated with a thermosetting polyester resin comprising polymerized styrenated diethylene glycol maleate having a thickness of .005 inch and similar material containing 2-plies of glass cloth and having a thickness of .009 inch, a laminate of similar resin with a plurality of plies of paper reinforcement having a thickness of .037 inch, copper foil having respectively thicknesses of .002 inch and .005 inch, aluminum foil having a thickness of .005 inch, a film of plastic synthetic resin web comprising principally plasticized vinyl chloride having a thickness of .012 inch, and a laminate comprising Mylar .0005 inch thick laminated to cotton fabric coated with resin comprising principally vinyl chloride having a thickness of .037 inch. Thus it may be seen that the apparatus is particularly suitable for abrasively treating webs having a thickness of less than about .050 inch and comprising synthetic resinous surfaces and metal foil webs having a thickness on the order of .002 to .005 inch but suitably less than .010 inch and having any visible thickness, the lower limit being indicated by the fact that a suitable surface has been obtained on vacuum deposited layer of aluminum on Mylar which itself was .0005 inch thick, the aluminum having a thickness measurable only in microns; the abraded surface was provided on the aluminum layer without destroying this layer or removing it from the Mylar. The invention is suitable for providing surfaces having generally matte or deglossed properties, surfaces having increased coefficients of friction, surfaces having improved adherence to laminating adhesives and other adhesives and for other applications wherein a roughened or matte surface is desirable on a synthetic resin web.

Having thus disclosed my invention, I claim:

1. Apparatus for abrasively treating a surface of a continuous web comprising an enclosed cabinet, means for feeding a web thereinto, wind-up means adapted to draw said web through said cabinet, a back-up belt within said cabinet above said web having a downwardly arcuately disposed lower run, an idler roll at each end thereof and under said web, at least one abrasive throwing wheel within said cabinet disposed to hurl abrasive granules against at least a portion of the lower surface thereof supported by said arcuately disposed run and at an acute angle to said surface, and cleaning means for removing residual abrasive granules from surfaces of said web.

2. Apparatus for abrasively treating a surface of a continuous web comprising an enclosed cabinet, means for feeding a web thereinto, wind-up means adapted to draw said web through said cabinet, a back-up belt within said cabinet above said web having a downwardly arcuately disposed lower run, an idler roll at each end thereof and under said web, a plurality of abrasive throwing wheels within said cabinet disposed to hurl abrasive granules against at least a portion of the lower surface thereof supported by said arcuately disposed run and at an acute angle to said surface, and cleaning means for removing residual abrasive granules from surfaces of said web.

3. The device of claim 2 characterized by the surface of said back-up belt being elastomeric.

4. Apparatus for abrasively treating one surface of a continuous web having a thickness of less than .050 inch comprising an enclosed cabinet, means for feeding such a web thereinto, wind-up means adapted to draw said web through said cabinet, a backing-up and conveying belt within said cabinet disposed above said web and having a downwardly arcuately disposed lower run adapted to travel at precisely the same surface speed as said web, an idler roll at each end of said belt and under said web disposed to maintain said web against said arcuately disposed run, at least one abrasive throwing wheel within said cabinet disposed to hurl abrasive granules at a portion of the under surface of said web supported by said arcuately disposed run and at an acute angle to said surface, and cleaning means for removing residual abrasive granules from surfaces of said web.

5. Apparatus for abrasively treating one surface of a continuous web having a thickness of less than .050 inch comprising an enclosed cabinet, means for feeding such a web thereinto, wind-up means adapted to draw said web through said cabinet, a backing-up and conveying belt within said cabinet disposed above said web and having a downwardly arcuately disposed lower run adapted to travel at precisely the same surface speed as said web, an idler roll at each end of said belt and under said web disposed to maintain said web against said arcuately disposed run, a plurality of abrasive throwing wheels within said cabinet disposed to hurl abrasive granules at a portion of the under surface of said web supported by said arcuately disposed run and at an acute angle to said surface, and cleaning means for removing residual abrasive granules from surfaces of said web.

6. The device of claim 5 characterized by the surface of said backing-up belt being elastomeric.

7. Apparatus for treating the surface of a thin film of plastic material in the form of a continuous web to produce a dull finish in the surface thereof comprising an enclosure having an inlet at one end and an outlet at the other through which the web passes through the enclosure, means for advancing the web continuously under slight lengthwise tension through the enclosure from the inlet to the outlet, a supporting member comprising an endless horizontally disposed belt mounted in the enclosure for linear movement at a rate corresponding to the linear speed of the web through the enclosure, a rigid member having a downwardly extending curvilinear portion in engagement with the lower run of the belt to cause the lower run of the belt to travel in a corresponding linear path which extends downwardly into the path of the web advanced under slight tension through the enclosure whereby the web comes into firm contacting relation with the underside of the lower run of the belt during travel with the belt about the arcuate portion, and means for throwing fine abrasive particles upwardly at a low angle onto the lower face of the web while being backed up by the belt.

References Cited in the file of this patent

UNITED STATES PATENTS

| | | |
|---|---|---|
| 2,173,364 | Jesser | Sept. 19, 1939 |
| 2,204,588 | Guite | June 18, 1940 |
| 2,448,316 | Lesavoy | Aug. 31, 1948 |

UNITED STATES PATENT OFFICE
CERTIFICATE OF CORRECTION

Patent No. 2,952,100                                September 13, 1960

Perry H. Pelley

It is hereby certified that error appears in the above numbered patent requiring correction and that the said Letters Patent should read as corrected below.

Column 6, line 20, for ".005" read -- .0005 --.

Signed and sealed this 31st day of October 1961.

(SEAL)
Attest:

ERNEST W. SWIDER                                DAVID L. LADD
Attesting Officer                               Commissioner of Patents
                                                USCOMM-DC